(12) United States Patent
Saindon et al.

(10) Patent No.: US 7,035,804 B2
(45) Date of Patent: Apr. 25, 2006

(54) SYSTEMS AND METHODS FOR AUTOMATED AUDIO TRANSCRIPTION, TRANSLATION, AND TRANSFER

(75) Inventors: Richard J. Saindon, Waunakee, WI (US); Stephen Brand, Madison, WI (US)

(73) Assignee: Stenograph, L.L.C., Mount Prospect, IL (US)

( * ) Notice: Subject to any disclaimer, the term of this patent is extended or adjusted under 35 U.S.C. 154(b) by 0 days.

(21) Appl. No.: 09/929,204

(22) Filed: Aug. 14, 2001

(65) Prior Publication Data

US 2002/0161579 A1    Oct. 31, 2002

Related U.S. Application Data

(63) Continuation-in-part of application No. 09/843,186, filed on Apr. 4, 2001, now Pat. No. 6,820,055.

(51) Int. Cl.
*G10L 15/06*    (2006.01)

(52) U.S. Cl. .................... 704/271; 704/235; 704/270.1
(58) Field of Classification Search ................ 704/271, 704/270.1, 235; 348/468
See application file for complete search history.

(56) References Cited

U.S. PATENT DOCUMENTS

| | | | |
|---|---|---|---|
| 5,146,439 A | 9/1992 | Jachmann et al. | 369/25 |
| 5,424,785 A * | 6/1995 | Orphan | 348/722 |
| 5,497,241 A | 3/1996 | Ostrover et al. | 358/341 |
| 5,497,373 A * | 3/1996 | Hulen et al. | 370/259 |
| 5,563,804 A * | 10/1996 | Mortensen et al. | 709/206 |
| 5,740,245 A | 4/1998 | Bennett et al. | 380/9 |
| 5,751,338 A * | 5/1998 | Ludwig, Jr. | 348/14.12 |
| 5,768,539 A * | 6/1998 | Metz et al. | 709/249 |
| 5,805,153 A * | 9/1998 | Nielsen | 725/37 |
| 5,845,150 A | 12/1998 | Henion | 369/25 |
| 5,852,721 A * | 12/1998 | Dillon et al. | 709/217 |
| 5,900,908 A * | 5/1999 | Kirkland | 348/62 |
| 5,914,719 A * | 6/1999 | Herz | 345/418 |
| 5,926,787 A | 7/1999 | Bennett et al. | 704/235 |
| 5,950,194 A | 9/1999 | Bennett et al. | 707/3 |
| 5,990,908 A | 11/1999 | Thingvold | 345/474 |
| 6,100,882 A * | 8/2000 | Sharman et al. | 704/235 |
| 6,237,029 B1 * | 5/2001 | Master et al. | 709/217 |
| 6,373,526 B1 * | 4/2002 | Kessler et al. | 348/468 |
| 6,903,779 B1 * | 6/2005 | Dyer | 348/465 |
| 2005/0210511 A1 * | 9/2005 | Pettinato | 725/61 |

FOREIGN PATENT DOCUMENTS

| | | | | |
|---|---|---|---|---|
| GB | 2 285 895 | * | 7/1995 | 704/235 |
| WO | WO 00/57642 | | 9/2000 | |

* cited by examiner

*Primary Examiner*—Donald L. Storm
(74) *Attorney, Agent, or Firm*—Medlen & Carroll, LLP

(57) ABSTRACT

The present invention relates to systems and methods for audio processing. For example, the present invention provides systems and methods for creating standardized text for streaming text application from a variety of different speech-to-text software formats and systems and methods for interfacing a stenographic computer with an electronic communications network.

2 Claims, 1 Drawing Sheet

SYSTEMS AND METHODS FOR AUTOMATED AUDIO TRANSCRIPTION, TRANSLATION, AND TRANSFER

The present application is a Continuation-in-Part application of application Ser. No. 09/843,186, filed Apr. 4, 2001 now U.S. Pat. No. 6,820,055, herein incorporated by reference in its entirety.

FIELD OF THE INVENTION

The present invention relates to systems and methods for multimedia processing. For example, the present invention provides systems and methods for receiving spoken audio, converting the spoken audio to text, and transferring the text to a user. As desired, the speech or text can be translated into one or more different languages. Systems and methods for real-time conversion and transmission of speech and text are provided, including systems and methods for large scale processing of multimedia events.

BACKGROUND OF THE INVENTION

The Internet has revolutionized the way that information is delivered and business is done. In June of 1999, Nielsen/NetRatings reported that there were a total of 63.4 million active Internet users in the United States, and 105.4 million total Internet users with Internet access. The average user spent 7 hours, 38 minutes on-line that month. Furthermore, user year-to-year growth rate is expected be in the range of 15% to 25% percent. Worldwide, it expected that there be greater than 250 million residential users, and greater than 200 million corporate users by the year 2005.

In the last few years, improvements in software and hardware have allowed the Internet to be used on a large scale for the transmission of audio and video. Such improvements include the availability of real-time streaming audio and video. Numerous media events are now "broadcast" live over the Internet, allowing users to see and hear speeches, music events, and other artistic performances. With further increases in speed, the Internet promises to be the primary method for transmitting and receiving multimedia information. Present real-time applications, however, are limited in their flexibility and usefulness. For example, many real-time audio and video application do not permit users to edit or otherwise manipulate the content. The art is in need of new systems and methods for expanding the usefulness and flexibility of multimedia information flow over electronic communication systems.

SUMMARY OF THE INVENTION

The present invention relates to systems and methods for multimedia processing. For example, the present invention provides systems and methods for receiving spoken audio, converting the spoken audio to text, and transferring the text to a user. As desired, the speech or text can be translated into one or more different languages. Systems and methods for real-time conversion and transmission of speech and text are provided.

For example, the present invention provides Web-enabled systems comprising audio-to-text captioning capabilities, audio conference bridging, text-to-speech conversion, foreign language translation, web media streaming, and voice-over-IP integrated with processing and software capabilities that provide streaming text and multimedia information to viewers in a number of formats including interactive formats.

The present invention also provides foreign translation systems and methods that provide end-to-end audio transcription and language translation of live events (i.e., from audio source to intended viewer), streamed over an electronic communication network. Such systems and methods include streaming text of the spoken word, complete accumulative transcript, the ability to convert text back into audio in any desired language, and comments/questions handling submitted by viewers of the multimedia information (e.g., returned to each viewer in their selected language). In some embodiments, text streaming occurs through independent encoded media streaming (e.g., separate IP ports). The information is provided in any desired format (e.g., MICROSOFT, REAL, QUICKTIME, etc.). In some embodiments, real-time translations are provided in multiple languages simultaneously or concurrently (e.g., each viewer selects/or changes their preferred language during the event).

The present invention also provides audio to text conversion with high accuracy in short periods of time. For example, the present invention provides systems and methods for accurate transcription of live events to 95–98%, and accurate transcription of any event to 100% within a few hours of event completion.

The systems and methods of the present invention may be applied to interactive formats including talk-show formats. For example, as described in more detail below, in some embodiments, the systems and methods of the present invention provide an electronic re-creation of the television talk-show model over the web without requiring the participants to use or own any technology beyond a telephone and a web connected device (e.g., a personal computer). Talk-show participation by invited guests or debatees may be conducted through the web. In some embodiments, the system and methods employ web-based, moderator and participant controls and/or web-based call-in "screener" controls. In some embodiments, viewer interaction is handled via email, comment/question queue maintained by a database, and/or phone call-ins. In some preferred embodiments of the present invention, real-time language translation in multiple languages is applied to allow participation of individuals, independent of their language usage. Streaming multimedia information provided in the interactive format includes, as desired, graphical or video slides, images, and/or video.

The present invention further provides systems and methods for complete re-creation of the classroom teaching model, including live lectures (audio and video), presentation slides, slide notes, comments/questions (via email, chat, and/or live call-ins), streaming transcript/foreign translations, complete lecture transcript, streaming videos, and streaming PC screen capture demos with audio voice-over.

For use in such applications, the present invention provides a system comprising a processor, said processor configured to receive multimedia information and encode a plurality of information streams comprising a separately encoded first information stream and a separately encoded second information stream from the multimedia information, said first information stream comprising audio information and said second information stream comprising text information (e.g., text transcript information generated from the audio information). The present invention is not limited by the nature of the multimedia information. Multimedia information includes, but is not limited to, live event audio, televised audio, speech audio, and motion picture audio. In some embodiments, the multimedia information comprises information from a plurality of distinct locations (e.g., distinct geographic locations).

In some embodiments, the system further comprises a speech to text converter, wherein the speech to text converter is configured to produce text from the multimedia information and to provide the text to the processor. The present invention is not limited by the nature of the speech to text converter. In some embodiments, the speech to text converter comprises a stenograph (e.g., operated by a stenographer). In other embodiments, the speech to text converter comprises voice recognition software. In preferred embodiments, the speech to text converter comprises an error corrector configured to confirm text accuracy prior to providing the text to the processor.

In some embodiments, the processor further comprises a security protocol. In some preferred embodiments, the security protocol is configured to restrict participants and viewers from controlling the processor (e.g., a password protected processor). In other embodiments, the system further comprises a resource manager (e.g., configured to monitor and maintain efficiency of the system).

In some embodiments, the system further comprises a conference bridge configured to receive the multimedia information, wherein the conference bridge is configured to provide the multimedia information to the processor. In some embodiments, the conference bridge is configured to receive multimedia information from a plurality of sources (e.g., sources located in different geographical regions). In other embodiments, the conference bridge is further configured to allow the multimedia information to be viewed (e.g., is configured to allow one or more viewers to have access to the systems of the present invention).

In some embodiments, the system further comprises a delay component configured to receive the multimedia information, delay at least a portion of the multimedia information, and send the delayed portion of the multimedia information to the processor.

In some embodiments, the system further comprises a text to speech converter configured to convert at least a portion of the text information to audio.

In still other embodiments, the system further comprises a language translator configured to receive the text information and convert the text information from a first language into one or more other languages.

In some embodiments, the processor is further configured to transmit a viewer output signal comprising the second information stream (e.g., transmit information to one or more viewers). In some embodiments, the viewer output signal further comprises the first information stream. In preferred embodiments, the viewer output signal is compatible with a multimedia software application (e.g., a multimedia software application on a computer of a viewer).

In some embodiments, the system further comprises a software application configured to display the first and/or the second information streams (e.g., allowing a viewer to listen to audio, view video, and view text). In some preferred embodiments, the software application is configured to display the text information in a distinct viewing field. In some embodiments, the software application comprises a text viewer. In other embodiments, the software application comprises a multimedia player embedded into a text viewer. In some preferred embodiments, the software application is configured to allow the text information to be printed.

The present invention further provides a system for interactive electronic communications comprising a processor, wherein the processor is configured to receive multimedia information, encode an information stream comprising text information, send the information stream to a viewer, wherein the text information is synchronized with an audio or video file, and receive feedback information from the viewer.

The present invention also provides methods of using any of the systems disclosed herein. For example, the present invention provides a method for providing streaming text information, the method comprising providing a processor and multimedia information comprising audio information; and processing the multimedia information with the processor to generate a first information stream and a second information stream, said first information stream comprising the audio information and said second information stream comprising text information, said text information corresponding to the audio information.

In some embodiments, the method further comprises the step of converting the text information into audio. In other embodiments, the method further comprises the step of translating the text information into one or more different languages. In still other embodiments, the method further comprises the step of transmitting the second information stream to a computer of a viewer. In other embodiments, the method further comprises the step of receiving feedback information (e.g., questions or comments) from a viewer.

The present invention further provides systems and methods for providing translations for motion pictures, television shows, or any other serially encoded medium. For example, the present invention provides methods for the translation of audio dialogue into another language that will be represented in a form similar to subtitles. The method allows synchronization of the subtitles with the original audio. The method also provides a hardcopy or electronic translation of the dialogue in a scripted form. The systems and methods of the present invention may be used to transmit and receive synchronized audio, video, timecode, and text over a communication network. In some embodiments, the information is encrypted and decrypted to provide anti-piracy or theft of the material. Using the methods of the present invention, a dramatic reduction (e.g., 50% or more) in the time between a domestic motion picture release and foreign releases is achieved.

In some such embodiments, the present invention provides methods for providing a motion picture translation comprising, providing: motion picture audio information, a translation system that generates a text translation of the audio; and a processor that encodes text and audio information; processing the motion picture audio information with the translation system to generate a text translation of the audio; processing the text translation with the processor to generate encoded text information; processing the motion picture audio information with the processor to generate encoded audio information; and synchronizing the encoded text information and the encoded audio information. Such methods find use, for example, in reducing the cost and process delay of motion picture translations by more than 50% (e.g., 50%, 51%, . . . , 90%, . . . ).

The present invention also provides a system comprising a processor configured to receive text information from a speech-to-text converter, receive multimedia information from a conference bridge, encode text information into an information stream, encode multimedia information into an information stream, and send and receive information from a language translator. In some embodiments, the processor further comprises a resource manager configured to allow said processor to continuously process 10 or more (e.g., 11, 12, . . . , 100, . . . , 1000, . . . ) information streams simultaneously.

The present invention further provides systems and methods for two-way real time conversational language translation. For example, the present invention provides methods comprising, providing: a conference bridge configured to receive a plurality of audio information inputs, a speech-to-text converter, a text-to-speech converter, and a language translator; inputting audio from a first user to said conference bridge to provide first audio information; converting the first audio information into text information using the speech-to-text converter; translating the text information into a different language using the language translator to generate translated text information; converting the translated text information into translated audio using the text-to-speech converter; and providing the translated audio to a second (or other) user(s).

The present invention also provides scaled up systems and methods. For example, the present invention provides a system comprising a speech-to-text converter and a processor, said processor configured to receive text information from the speech to text converter and encode 10,000 or more text information streams (e.g., text information streams that are sent to viewers). In some embodiments, the system is configured (e.g., using a plurality of processors) to simultaneously transmit 10,000 or more text information streams (e.g., 100,000 or more to 1,000,000 or more). In some embodiments, the system further comprises a caption server configured to receive text information from the speech-to-text converter and configured to transmit text information to the processor. In some embodiments, the caption server is configured to simultaneously receive text information from 200 or more speech-to-text converters. In some embodiments, the caption server comprises multiple processors, wherein an unlimited number simultaneously text information streams are received from an unlimited number of speech-to-text converters. In some embodiments, the speech-to-text converter comprises a computer running captioning software. In some preferred embodiments, the computer comprises a software application that allows text information to be transmitted over an Internet without the use of a serial to IP device.

The present invention further provides a system comprising: a conference bridge configured to receive audio information; a speech-to-text converter configured to receive audio information from the conference bridge and to convert at least a portion of the audio information into text information; and a processor configured to receive the text information from the speech-to-text converter and to encode a text information stream. In some embodiments, one or more of the transmissions (e.g., receipt of information by the conference bridge, transmission of information from the conference bridge to the speech-to-text converter, transmission of information from the speech-to-text converter to the processor, or transmission of text information streams from the processor) is carried out by a wireless communication system. In some embodiments, the processor is further configured to transmit the text information stream to a computer system of a viewer. In some preferred embodiments, the processor is further configured to transmit a text viewer software application to the viewer. In still further preferred embodiments, the processor is further configured to receive feedback information from the viewer.

DEFINITIONS

Figure 1:
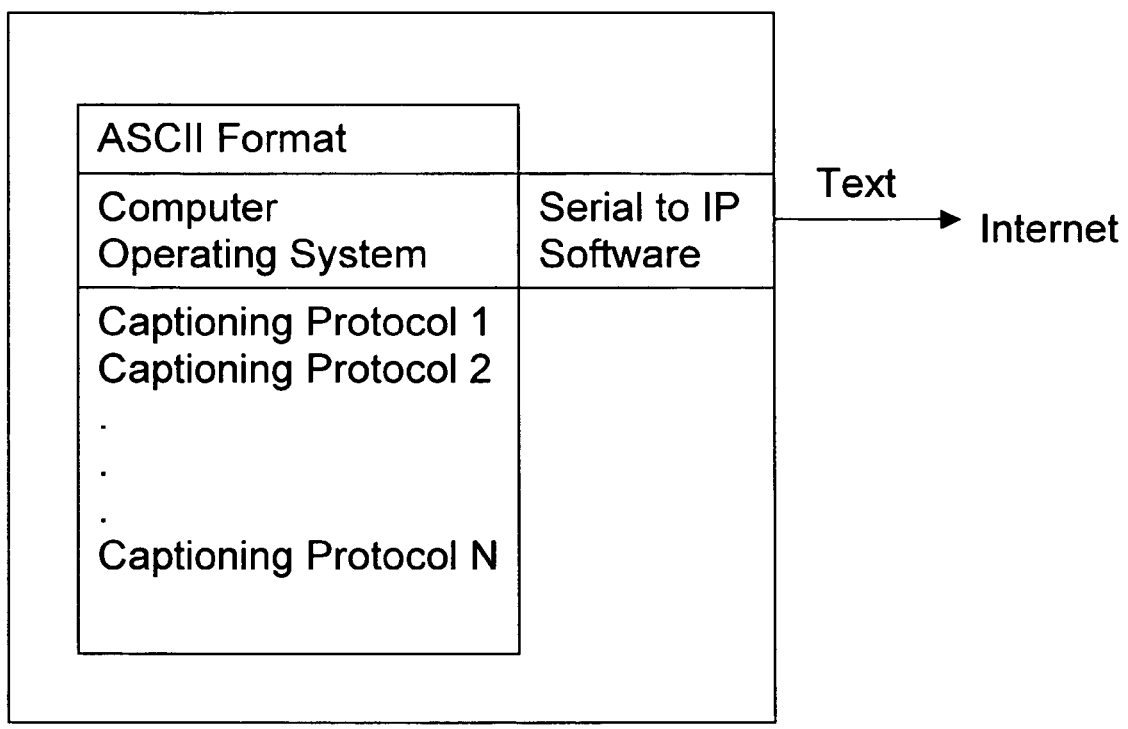
FIG. 1 shows a schematic representation of one embodiment of the systems of the present invention.

To facilitate an understanding of the present invention, a number of terms and phrases are defined below:

As used herein the terms "processor" and "central processing unit" or "CPU" are used interchangeably and refer to a device that is able to read a program from a computer memory (e.g., ROM or other computer memory) and perform a set of steps according to the program.

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, magnetic tape and servers for streaming media over networks.

As used herein the terms "multimedia information" and "media information" are used interchangeably to refer to information (e.g., digitized and analog information) encoding or representing audio, video, and/or text. Multimedia information may further carry information not corresponding to audio or video. Multimedia information may be transmitted from one location or device to a second location or device by methods including, but not limited to, electrical, optical, and satellite transmission, and the like.

As used herein the term "audio information" refers to information (e.g., digitized and analog information) encoding or representing audio. For example, audio information may comprise encoded spoken language with or without additional audio. Audio information includes, but is not limited to, audio captured by a microphone and synthesized audio (e.g., computer generated digital audio).

As used herein the term "video information" refers to information (e.g., digitized and analog information) encoding or representing video. Video information includes, but is not limited to video captured by a video camera, images captured by a camera, and synthetic video (e.g., computer generated digital video).

As used herein the term "text information" refers to information (e.g., analog or digital information) encoding or representing written language or other material capable of being represented in text format (e.g., corresponding to spoken audio). For example, computer code (e.g., in .doc, .ppt, or any other suitable format) encoding a textual transcript of a spoken audio performance comprises text information. In addition to written language, text information may also encode graphical information (e.g., figures, graphs, diagrams, shapes) related to, or representing, spoken audio. "Text information corresponding to audio information" comprises text information (e.g., a text transcript) substantially representative of a spoken audio performance. For example, a text transcript containing all or most of the words of a speech comprises "text information corresponding to audio information."

As used herein the term "configured to receive multimedia information" refers to a device that is capable of receiving multimedia information. Such devices contain one or more components that can receive a signal carrying multimedia information. In preferred embodiments, the receiving component is configured to transmit the multimedia information to a processor.

As used herein the term "encode" refers to the process of converting one type of information or signal into a different type of information or signal to, for example, facilitate the transmission and/or interpretability of the information or signal. For example, audio sound waves can be converted into (i.e., encoded into) electrical or digital information. Likewise, light patterns can be converted into electrical or digital information that provides and encoded video capture of the light patterns. As used herein, the term "separately encode" refers to two distinct encoded signals, whereby a first encoded set of information contains a different type of content than a second encoded set of information. For example, multimedia information containing audio and video information is separately encoded where video information is encoded into one set of information while the audio information is encoded into a second set of information. Likewise, multimedia information is separately encoded where audio information is encoded and processed in a first set of information and text corresponding to the audio information is encoded and/or processed in a second set of information.

As used herein the term "information stream" refers to a linearized representation of multimedia information (e.g., audio information, video information, text information). Such information can be transmitted in portions over time (e.g., file processing that does not require moving the entire file at once, but processing the file during transmission (the stream)). For example, streaming audio or video information utilizes an information stream. As used herein, the term "streaming" refers to the network delivery of media. "True streaming" matches the bandwidth of the media signal to the viewer's connection, so that the media is seen in realtime. As is known in the art, specialized media servers and streaming protocols are used for true streaming. RealTime Streaming Protocol (RTSP, REALNETWORKS) is a standard used to transmit true streaming media to one or more viewers simultaneously. RTSP provides for viewers randomly accessing the stream, and uses RealTime Transfer Protocol (RTP, REALNETWORKS) as the transfer protocol. RTP can be used to deliver live media to one or more viewers simultaneously. "HTTP streaming" or "progressive download" refers to media that may be viewed over a network prior to being fully downloaded. Examples of software for "streaming" media include, but are not limited to, QUICKTIME, NETSHOW, WINDOWS MEDIA, REALVIDEO, REALSYSTEM G2, and REALSYSTEM 8. A system for processing, receiving, and sending streaming information may be referred to as a "stream encoder" and/or an "information streamer."

As used herein, the term "digitized video" refers to video that is either converted to digital format from analog format or recorded in digital format. Digitized video can be uncompressed or compressed into any suitable format including, but not limited to, MPEG-1, MPEG-2, DV, M-JPEG or MOV. Furthermore, digitized video can be delivered by a variety of methods, including playback from DVD, broadcast digital TV, and streaming over the Internet. As used herein, the term "video display" refers to a video that is actively running, streaming, or playing back on a display device.

As used herein, the term "codec" refers to a device, either software or hardware, that translates video or audio between its uncompressed form and the compressed form (e.g., MPEG-2) in which it is stored. Examples of codecs include, but are not limited to, CINEPAK, SORENSON VIDEO, INDEO, and HEURIS codecs. "Symetric codecs" encodes and decodes video in approximately the same amount of time. Live broadcast and teleconferencing systems generally use symetric codecs in order to encode video in realtime as it is captured.

As used herein, the term "compression format" refers to the format in which a video or audio file is compressed. Examples of compression formats include, but are not limited to, MPEG-1, MPEG-2, MPEG-4, M-JPEG, DV, and MOV.

As used herein, the term "client-server" refers to a model of interaction in a distributed system in which a program at one site sends a request to a program at another site and waits for a response. The requesting program is called the "client," and the program that responds to the request is called the "server." In the context of the World Wide Web (discussed below), the client is a "Web browser" (or simply "browser") that runs on a computer of a user; the program which responds to browser requests by serving Web pages is commonly referred to as a "Web server."

As used herein, the term "hyperlink" refers to a navigational link from one document to another, or from one portion (or component) of a document to another. Typically, a hyperlink is displayed as a highlighted word or phrase that can be selected by clicking on it using a mouse to jump to the associated document or documented portion.

As used herein, the term "hypertext system" refers to a computer-based informational system in which documents (and possibly other types of data entities) are linked together via hyperlinks to form a user-navigable "web."

As used herein, the term "Internet" refers to any collection of networks using standard protocols. For example, the term includes a collection of interconnected (public and/or private) networks that are linked together by a set of standard protocols (such as TCP/IP, HTTP, and FTP) to form a global, distributed network. While this term is intended to refer to what is now commonly known as the Internet, it is also intended to encompass variations that may be made in the future, including changes and additions to existing standard protocols or integration with other media (e.g., television, radio, etc). The term is also intended to encompass non-public networks such as private (e.g., corporate) Intranets.

As used herein, the terms "World Wide Web" or "web" refer generally to both (i) a distributed collection of inter-linked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols that may be used in place of (or in addition to) HTML and HTTP.

As used herein, the term "web site" refers to a computer system that serves informational content over a network using the standard protocols of the World Wide Web. Typically, a Web site corresponds to a particular Internet domain name and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

As used herein, the term "HTML" refers to HyperText Markup Language that is a standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally, in specifying how the Web browser is to display the document, HTML tags can be used to create links to other Web documents (commonly referred to as "hyperlinks").

As used herein, the term "HTTP" refers to HyperText Transport Protocol that is the standard World Wide Web client-server protocol used for the exchange of information (such as HTML documents, and client requests for such documents) between a browser and a Web server. HTTP includes a number of different types of messages that can be sent from the client to the server to request different types of server actions. For example, a "GET" message, which has the format GET, causes the server to return the document or file located at the specified URL.

As used herein, the term "URL" refers to Uniform Resource Locator which is a unique address that filly specifies the location of a file or other resource on the Internet. The general format of a URL is protocol://machine address:port/path/filename. The port specification is optional, and if none is entered by the user, the browser defaults to the standard port for whatever service is specified as the protocol. For example, if HTTP is specified as the protocol, the browser will use the HTTP default port of 80.

As used herein, the term "PUSH technology" refers to an information dissemination technology used to send data to users over a network. In contrast to the World Wide Web (a "pull" technology), in which the client browser must request a Web page before it is sent, PUSH protocols send the informational content to the user computer automatically, typically based on information pre-specified by the user.

As used herein the terms "live event" and "live media event" are used interchangeably to refer to an event that is to be captured in the form of audio, video, text, or multimedia information, wherein the captured information is used to transmit a representation of the event (e.g., a video, audio, or text capture of the event) to one or more viewers in real time or substantially real time (i.e., it will be appreciated that delays on the order of seconds to minutes may be incurred in the capture, delivery, and/or processing of information prior to its display to viewers while still considering the display of the event as a "live" event). As used herein, "live event audio" refers to audio from a live event that is captured as audio information and transmitted, in some form, to a viewer in real time. As used herein, "live educational event" refers to a live event featuring an educational component directed at the viewer.

As used herein the term "televised event" refers to an event that is televised or is intended to be televised. "Televised audio" refers to the audio portion of a televised event, including, for example, spoken language and sounds, as well as music and sound effects. Television audio may be converted to information (e.g., multimedia or audio information).

As used herein the term "motion picture event" refers to an event that is incorporated into a motion picture or is intended to be incorporated into a motion picture. Motion picture events include material already captured in the form of video or film, as well as live events that are to be captured on video or film. "Motion picture audio" refers to the audio portion of a motion picture event, including, for example, the audio content of a soundtrack and voiceover in a completed motion picture.

As used herein the term "event audio" refers to the audio component of an event. Events include any live performance, prerecorded performance, and artificially synthesized performance or any kind (e.g., any event or material that contains speech).

As used herein the term "distinct locations" refers to two or more different physical locations where viewers can separately view a multimedia presentation. For example, a person viewing a presentation in one location (e.g., on a video monitor) would be in a distinct location from a second person viewing the same presentation (e.g., on a different video monitor) if the first and second persons are located in different rooms, cities, countries, and the like.

As used herein the term "speech to text converter" refers to any system capable of converting audio into a text representation or copy of the audio. For example, a stenographer listening to spoken language from an audio source and converting the spoken language to text using a stenograph comprises a speech to text converter. Likewise, a speech-to-text software application and the appropriate hardware to run it would be considered a speech to text converter (See e.g., U.S. Pat. Nos. 5,926,787, 5,950,194, and 5,740,245, herein incorporated by reference in their entireties). A system that is "configured to produce text from multimedia information" contains a component that receives multimedia information and a component that provides speech to text conversion.

As used herein the term "text to speech converter" refers to any system capable of converting text or text information into spoken audio. For example, a text-to-speech software application and the appropriate hardware to run it would be considered a text to speech converter. In some embodiments of the present invention, a single system may have text to speech and speech to text conversion capabilities. A system that is capable of processing "at least a portion of text information" is a system that can recognize all, or a portion of a text document or text information, and process the text or information (e.g., convert the text to audio).

As used herein the term "error corrector" refers to a system that contains a component capable of reviewing text converted from audio to confirm that accuracy of the conversion. If errors were made in the audio to text conversion, the error corrector identifies and corrects the errors. For example, a human reviewer of a previously computer generated speech to text transcript comprises an error corrector. A system that is "configured to confirm text accuracy" is a system that contains the appropriate components to allow an error corrector to review a speech to text translation. For example, where the correction is being conducted by a human reviewer, the system may comprise a display system for displaying the original conversion to the reviewer, an audio playback system for the reviewer to listen to the original audio, and a data input system for the reviewer to correct errors in the original conversion.

As used herein the term "security protocol" refers to an electronic security system (e.g., hardware and/or software) to limit access to processor to specific users authorized to access the processor. For example, a security protocol may comprise a software program that locks out one or more functions of a processor until an appropriate password is entered.

As used herein the term "conference bridge" refers to a system for receiving and relaying multimedia information to and from a plurality of locations. For example, a conference bridge can receive signals from one or more live events (e.g., in the form of audio, video, multimedia, or text information), transfer information to a processor or a speech-to-text conversion system, and send processed and/or unprocessed information to one or more viewers connected to the conference bridge. The conference bridge can also, as desired, be accessed by system administrators or any other desired parties.

As used herein the term "viewer" refers to a person who views text, audio, video, or multimedia content. Such content includes processed content such as information that has been processed and/or translated using the systems and methods of the present invention. As used herein, the phrase "view multimedia information" refers to the viewing of multimedia information by a viewer. "Feedback information from a viewer" refers to any information sent from a viewer to the systems of the present invention in response to text, audio, video, or multimedia content.

As used herein the term "resource manager" refers to a system that optimizes the performance of a processor or another system. For example a resource manager may be configured to monitor the performance of a processor or software application and manage data and processor allocation, perform component failure recoveries, optimize the receipt and transmission of data (e.g., streaming information), and the like. In some embodiments, the resource manager comprises a software program provided on a computer system of the present invention.

As used herein the term "delay component" refers to a device or program that delays one or more components of transmitted multimedia information. Delay components find use, for example, in delaying one portion of a multimedia signal to allow a separate portion (e.g., a separately processed portion) to be realigned with the first portion prior to displaying the multimedia content to a viewer. For example, an audio portion of multimedia information may be converted to text and one or more of the information components is delayed such that a viewer of the multimedia content is presented with a real time performance of the audio, video, and text. The phrase "delay at least a portion of multimedia information" refers to delaying at least one component of multimedia information, while optionally delaying or not delaying other components (e.g., delaying audio information, while delaying or not delaying corresponding video information).

As used herein the term "language translator" refers to systems capable of converting audio or text from one language into another language. For example, a language translator may comprise translation software (e.g., software that is capable of converting text in one language to text in another language). Language translators may further comprise an error correction system.

As used herein the term "viewer output signal" refers to a signal that contains multimedia information, audio information, video information, and/or text information that is delivered to a viewer for viewing the corresponding multimedia, audio, video, and/or text content. For example, viewer output signal may comprise a signal that is receivable by a video monitor, such that the signal is presented to a viewer as text, audio, and/or video content.

As used herein, the term "compatible with a software application" refers to signals or information configured in a manner that is readable by a software application, such that the software application can convert the signal or information into displayable multimedia content to a viewer.

As used herein the term "distinct viewing field" refers to a viewer display comprising two or more display fields, such that each display field can contain different content from one another. For example, a display with a first region displaying video and a second region displaying text (e.g., a text box) comprises distinct viewing fields. The distinct viewing fields need not be viewable at the same time. For example, viewing fields may be layered such that only one or a subset of the viewing fields is displayed. The undisplayed viewing fields can be switched to displayed viewing fields by the direction of the viewer.

As used herein the term "in electronic communication" refers to electrical devices (e.g., computers, processors, conference bridges, communications equipment) that are configured to communicate with one another through direct or indirect signaling. For example, a conference bridge that is connected to a processor through a cable or wire, such that information can pass between the conference bridge and the processor, are in electronic communication with one another. Likewise, a computer configured to transmit (e.g., through cables, wires, infrared signals, telephone lines, etc) information to another computer or device, is in electronic communication with the other computer or device.

As used herein the term "transmitting" refers to the movement of information (e.g., data) from one location to another (e.g., from one device to another) using any suitable means.

As used herein, the term "adminstrator" refers to a user of the systems of the present invention who is capable of approving customer registrations and event requests and/or a user with privileges to reconfigure the main content.

As used herein, the term "captionist" refers to a user of the systems of the present invention that transforms audio into captions and/or transcripts, typically using a stenograph-like device and appropriate software.

As used herein, the term "customer" refers to a user (e.g., a viewer) of the systems of the present invention that can view events and request services for events and/or pay for such services.

As used herein, the term "player" (e.g., multimedia player) refers to a device or software capable of transforming information (e.g., multimedia, audio, video, and text information) into displayable content to a viewer (e.g., audible, visible, and readable content).

DETAILED DESCRIPTION OF THE INVENTION

The present invention comprises systems and methods for providing text transcripts of multimedia events. For example, text transcripts of live or pre-recorded audio events are generated by the systems and methods of the present invention. The audio may be a component of a more complex multimedia performance, such as televised or motion picture video. Text transcripts are made available to viewers either as pure text transcripts or in conjunction with audio or video (e.g., audio or video from which the text was derived). In some preferred embodiments of the present invention (e.g., for live events), text is encoded in an information stream and streamed to a viewer along with the audio or video event. In some such embodiments, the text is configured to be viewable separate from the media display on a viewer's computer. In yet other preferred embodiments, the text is provided to the viewer in a manner that allows the viewer to manipulate the text. Such manipulations include copying portions of the text into a separate file location, printing the text, and the like.

The systems and methods of the present invention also allow audio to be translated into one or more different languages prior to delivery to a viewer. For example, in some embodiments, audio is converted to text and the text is translated into one or more desired languages. The translated text is then delivered to the viewer along with the original audio-containing content. In some embodiments, the text is re-converted to audio (e.g., translated audio) and the audio is streamed to the viewer, with or without the text transcript.

The systems and methods of the present invention find use in numerous applications, including, but not limited to, the generation of text from live events (e.g., speeches), televised events, motion pictures, live education events, legal proceedings, text for hearing impaired individuals, or any other application where a speech-to-text or audio-to-text conversion is desired.

Certain preferred embodiments of the present invention are described in detail below. These illustrative examples are not intended to limit the scope of the invention. The description is provided in the following sections: I) Information Processing Systems and II) Applications.

I) Information Processing Systems

The present invention provides systems for processing media events to generate text from an audio component of a media event and to process, as desired, and deliver the text to a viewer. In this embodiment In some embodiments, the audio information of a media event is transferred to a conference bridge. Audio information received by the conference bridge is then sent to one or more other components of the system. For example, audio information may be sent to a speech-to-text converter (e.g., a captionist/transcriptionist and/or voice recognition software) where the audio is converted to text. The media information received by the conference bridge may also be sent directly to a processor that encodes the audio for delivery to a viewer (e.g., compresses the audio and/or video components of multimedia information into streaming data for delivery to a viewer over a public or private electronic communication network). Text information that is generated by the speech-to-text converter is also sent to the processor for delivery to a viewer. In preferred embodiments, the text information is encoded in a separate delivery stream than the audio or video components of the multimedia information that is sent to a viewer. The text information, as desired, can be translated into one or more different languages. For example, in some embodiments, the encoded text stream is translated using a real-time language translator (e.g., SysTran, Enterprise).

Processed multimedia information and text streams may be delivered directly to one or more viewers or the multimedia information may be delivered through an intermediary (e.g., through one or more electronic network service components including, but not limited to, web servers, databases, and information streamers). In some embodiments, the multimedia and text information is configured to be readable by a media player of a viewer. In some embodiments, the text information is configured to be readable by a separate text viewer application. The separate text box may be provided as a computer program, distinct from the media player or may be integrated with a media player. In some such embodiments, a player application is delivered to, or accessed by the viewer. The text received by the viewer can further be re-converted to audio. For example, streaming audio generated from text by a processor of the present invention may be sent to a viewer with or without the corresponding text. This has particular application where the text has been translated into a language of the viewer (e.g., where the language of the viewer is different than the language of the original audio event). In some preferred embodiments, the system of the present invention is configured to receive feedback from the viewer (in the form of comments or questions). The feedback can occur through any suitable means, including, but not limited to, web based email, a question queue integrated with the media player or text display application, and direct call-in through the conference bridge (e.g., using either voice-over-IP or public switched network). The question queue can be run through the language translator in both directions (e.g., questions from the viewer to a screener or moderator, and all approved questions refreshed back to all viewers are translated to the language of each participant exposed to the material).

In some preferred embodiments, one or more (or all) of the components of the invention are automated. For example, in some embodiments, participants in the event to be transmitted (e.g., a live event) and viewers simply access the systems of the present invention through a web-based interface. No addition human interaction is necessary to manage the processor or information processing components of the present invention. Once accessed, the event can proceed, with streaming text information from the event being sent to the viewer, and optionally, with feedback (e.g., questions/comments) from viewers being made available to participants and other viewers in any desired format and in any number of languages.

A. Media Events

The present invention finds use with a wide variety of media events, including live and non-live events (e.g., transcription/translation from pre-recorded media). Any event that contains an audio component that can be converted to text finds use with the systems and methods of the present invention. Such events include, but are not limited to, live speeches (e.g., political speeches), news events, educational events (e.g., educational events for distance learning), live or pre-recorded video (e.g., television, motion pictures, etc), artistic performances, radio performances, legal proceedings, talk-shows, and the like. The present invention may be used for interactive events, wherein information is continuously received, processed, and delivered to participants and viewers.

B. Conference Bridge

In some embodiments of the present invention, a conference bridge is employed to manage incoming content, including multimedia information (e.g., audio information) as well as viewer feedback (e.g., in the form of live call-in comments and questions, and the like). The conference bridge can be configured to deliver incoming information to other components of the system, including speech-to-text converters and processors. In some embodiments of the present invention, only the audio information component of the multimedia information generated by an event is processed through the conference bridge. In other embodiments, video or other multimedia components are also processed through the conference bridge. The conference bridge may contain one or more devices that allow information from different sources to be received simultaneously or at different times. For example, the conference bridge can be configured to receive digital or analog audio information from sources including, but not limited to, telephone lines, cable connections, satellite transmissions, direct connections to microphones, and the like.

In some embodiments of the present invention, the conference bridge is used in an interactive talk-show format. For example, multimedia information generated at a live event is transmitted to the conference bridge. The multimedia information includes audio from a moderator and participants of the live event. Audio information can also be received from one or more remote recipients. Viewers (e.g., call-in viewers) of the talk-show can also send audio information to the conference bridge. As desired, the information content from the call-in viewers can be screened to determine if it is appropriate to disseminate to other viewers or participants. In such embodiments, a call-in screener is connected to the conference bridge such that the call-in screener monitors the call-in audio from the viewers prior to it being heard or viewed by other viewers or participants. The conference bridge can be configured to allow different levels of access and information processing. For example, the event participant audio information can automatically be processed to text, while the call-in viewer audio is originally directed to a private call-in virtual conference, monitored, and only sent to the live virtual conference for text conversion if approved by the screener. Information that is to be converted to text is sent to a speech-to-text converter. The speech-to-text converter need not receive the video of the live event, but can simply be sent the audio (e.g., through the conference bridge) that is to be converted to text. Additional participants may also be connected to the conference bridge including a system administrator or operator. The control of the conference bridge can be operated directly or over a communications network. For example, all of the moderator, participant, and administrator functions can be controlled over the World Wide Web.

The conference bridge is connected to a processor or processors that encode the audio information for delivery to one or more viewers, and broadcast the streaming text from the same processor(s) (server) or from a dedicated server. Multimedia information received by the conference bridge is sent to the processor through any appropriate connection (direct or indirect, e.g., Intranet). For example, information may be transmitted or sent through a direct connection (e.g., through a cable connected to a T-1 of the conference bridge, through an intermediate Lucent PBX to convert it back to analog, and then to a sound card input of a computer containing the processor). In some embodiments, text information is sent directly from the speech-to-text converter to the processor. In embodiments where the text information and multimedia information (e.g., audio information) are to be simultaneously sent to a viewer, the multimedia information may need to be delayed in order to align the text to the multimedia information. This can be accomplished, for example, through the use of a delay component (e.g., an audio delay device, e.g., Prime Image Pick-2) during the transmission of the multimedia information from the conference bridge to the processor. The audio information may also be boosted using an amplifier (e.g., to provide a strong signal or to normalize audio levels from different sources, e.g., ATI MM-100 amplifier).

In preferred embodiments (e.g., for high usage and automated systems), the conference bridge should be able to automatically answer dial-in phone calls. During the development of the present invention, it was determined that the analog inputs of Lucent Legend systems were not suitable for automatic answering. To allow automated answering, an Innkeeper 1 system (Digital Hybrid, J K Audio) was utilized. This system provides the further advantage of providing built-in audio amplification.

In some embodiments of the present invention wireless systems are used to receive information from events and/or to transmit information between components of the systems of the present invention or between the systems of the present invention and viewers (See e.g., U.S. Pat. Nos. 6,097,733, 6,108,560, and 6,026,082, herein incorporated by reference in their entireties). In some preferred embodiments, streaming text generated by the systems and methods of the present invention is sent to viewers using a wireless communication system. To facilitate transfer, the present invention provides JAVA encoded streaming text information. JAVA encoding creates small files that permit real-time transmission of text information of the present invention. In some embodiments, streaming text is sent to handheld wireless devices of a user. Such methods find particular use with hearing impaired individuals, who can receive real-time streaming text of any live audio event on a wireless handheld device.

C. Speech-to-Text Converter

Speech to text conversion is accomplished using any suitable system. For example, in some embodiments of the present invention, speech-to-text conversion is carried out using a human captionist/transcriptionist. In such embodiments, the captionist listens to audio and encodes a text transcript of the audio (e.g., using a stenograph machine and stenographic software). The captionist need not be located at the site of the event or at the location of the conference bridge or processor. For example, in some embodiments, audio information is transmitted to the captionist and text information recorded by the captionist is transmitted to the processor (e.g., over an electronic communication network).

Speech to text conversion can also be carried out using voice recognition hardware and/or software. Audio information can be sent directly to the voice recognition system or can be pre-processed. Pre-processing may be desired to, for example, remove or reduce unwanted non-speech audio information or modify the audio information to maximize the performance of the voice recognition system.

In some embodiments, an error corrector is used to improve the accuracy of the speech to text conversion. Error correction can occur, for example, through the use of human and/or software transcription. For example, in some embodiments, text generated using voice recognition software is monitored by a human. Errors are identified and/or corrected. Where text is being streamed in real time or near real time, subsections of the text are reviewed for errors and corrected, allowing accurate text to be passed to the viewer in the minimum amount of time. In some embodiments, of the present invention, uncorrected text is sent in real-time to the viewer, while a corrected, more accurate version is made available at a later time (e.g., later during the event, immediately following the event, or after the event).

In some embodiments, once the corrected copy of the transcript is complete, language translations are re-applied and one or more language versions are made available to the customer (e.g., via email or secured web site). Text information generated by the speech-to-text converter and/or language translator is sent to a processor for further processing and delivery to one or more viewers.

In some embodiments, the present invention provides efficient systems for transferring information from a captionist to the processors of the present invention. Traditionally, human captionists prepare text transcripts using a software application on a personal computer. Using standard applications, there is limited flexibility in transferring the text from the personal computer of the captionist to other locations (e.g., to other computers). Presently, software programs such as CASEVIEW (Stenograph Corporation, Mount Prospect, Ill.) allow users access to the text information if a direct hardware link to the computer of the captionist is made. The present invention provides hardware and/or software solutions to facilitate flow of text information from captionists to the processors of the present invention (e.g., to a text streaming server of the present invention). In some such embodiments, a serial to IP device (e.g., products available from Precidia Corporation, Canada, including but not limited to the Cypher ASIC) is attached to a serial port of the captionist computer to allow direct access to the Internet or other TCP/IP electronic environment. In preferred embodiments, a software application is employed to carry out the function of the serial to IP device, without the need for hardware. In particularly preferred embodiments, the software application is linked to the operating system of the captionist computer, allowing any type of captioning software to be used. In some preferred embodiments, the output signal is an ASCII format. In some embodiments, SERIAL-IP software (Tactical Systems) is used in place of a serial to IP device.

The present invention also provides systems and methods for recognizing any format of data obtained from captionists. Captionists use different software protocols encoding text (e.g., CASEVIEW, SMARTENCODER, TAC, SIMULVIEW). The streaming text encoded by the present invention should be of a single format. Therefore the present invention provides parsing routines to identify and/or convert text obtained from different captioning protocols into a single standard format. In some embodiments, captionists that use the systems and methods of the present invention are registered, such that the protocol used by the captionist is known and the correct parsing routine is used with information obtained from the captionist. In some embodiments, a database is maintained that correlates particular captionists to particular parsing routines. In other embodiments, there is no preexisting knowledge of the captionists protocol. In such embodiments, information obtained from the captionist is monitored to identify one or more unique characteristics of a particular protocol. Once identified, the information from the captionist is routed (e.g., automatically) through the appropriate parsing routine. The parsing routines of the present invention comprise software applications that receive captionist information and, based on known information encoding characteristics of the captionist information (e.g., available from the manufactures of the captioning software), alter the information into a format suitable for use with the present invention (e.g., create grammatically correct and coherent text information for using in the generation of streaming text files).

D. Processors

In some embodiments, multimedia information is received by a processor through a conference bridge and/or from a speech-to-text converter and converted to an appropriate format to allow useful delivery to one or more viewers. For example, in some embodiments of the present invention, streaming media is used to provide audio, video, and text to viewers. In such embodiments, the processor encodes one or more information streams from the audio and/or video information of the multimedia information. The processor also encodes (e.g., separately) a text stream. The text and multimedia information are then sent, directly or indirectly, to one or more viewers.

Prior to delivery to viewers, the media and/or text information may be further processed, as desired. For example, in some embodiments, text is translated using any suitable language translator system (e.g., foreign language real-time translation software, e.g., SysTran). In some embodiments, where text is being sent in real time to viewers, each sentence is translated before sending the individual words of the sentence to the viewer. This allows for grammatically accurate translations. For live events, translated text is refreshed at one or more intervals to update the translated information received by a viewer during the live event.

During the development of the present invention, it was determined that applying text directly from a text-to-speech converter often did not provide sufficient text quality to allow accurate translations. To address this problem, a series of experiments were performed. It was determined that a three-step process could be applied to generate text that provides accurate translations. The first step applies a capitalization check to determine if proper nouns are capitalized. This step is conducted by 1) determining if a candidate word appears in a dictionary of a spell checking software application (e.g., MICROSOFT WORD 2002); if not, assign a positive score; 2) checking the neighboring words on either side of the candidate word to determine if they are capitalized; if so, assign a positive score; and 3) determining if the candidate word appears in a dictionary of a spell checking software application as a proper noun; if so, assign a positive score. If either the first and second or second and third factors result in a positive score, the candidate word is capitalized. If only one of the factors results in a positive score, capitalization is dependent on the nature of the source of the text. For text that is considered "high" in proper nouns (e.g., source of the text is a news broadcast), the candidate word is capitalized even if only one of the factors results in a positive score. A scoring system intelligence may be applied based on experience with types of text (e.g., political speech, corporate speech, educational speech, entertainment content) or with text from a specific individual. This scoring system is developed, for example, through empirical testing, weighing each of the factors at the appropriate level to achieve the most accurate results (e.g., for a specific individual, factor one may be assigned a +1 [not in the dictionary] or 0 [in the dictionary] and given a multiplier score of 1.5; factor two may be assigned a +1 [neighboring word is capitalized] or −1 [neighboring words are not capitalized] and given a multiplier score of 0.8; factor three may be assigned a +1 [appears as a proper noun in the dictionary] and given a multiplier score of 2.0; with a positive sum of the three factors resulting in the selection of capitalized version of the candidate word). Scoring system intelligence may be stored in a database for use in automatically assigning the appropriate intelligence scoring system to the specific individual or type of speech being translated. The identity of the source of the speech can be identified, for example, upon login.

The capitalization checked text is then applied to the second step. The second step applies a spell checking software application (e.g., MICROSOFT WORD 2002) for general spell checking. For automated systems, if the software application indicates an incorrect spelling and a suggested spelling is available, the highest probability suggested spelling is selected.

The spell-checked text is then applied to the third step. The third step applies a grammar checking software application (e.g., MICROSOFT WORD 2002) for general grammar checking. For automated systems, changes are only made if a suggested correction is available. Thus, items such as converting contractions into non-contraction, spacing, and punctuation are corrected. Text that has undergone all three steps is then ready for translation. In preferred embodiments, where any change is made in the text during any of the steps, a log is created, documenting the changes to allow concurrent or later inspection (e.g., to allow manual correction of missed errors, to cancel erroneously text and/or to track the effect of changes in the correction protocol).

During the development of the present invention, it was determined that audio from a multimedia event would often be to low in level for use in encoding streaming audio for use by a viewer. To compensate, in some embodiments of the present invention audio amplification is applied to the audio information prior to encoding the information into an information stream. Likewise, during the development of the present invention, it was determined that audio information should be delayed so that alignment of text information and audio streams can be properly carried out. Audio amplification and delay alignment of multimedia information with text information can be carried out by the processor or by systems connected to the processor (e.g., analog or digital amplifiers and delays positioned between the conference bridge and processor).

The efficiency of the processor may be monitored and controlled by a resource manager (e.g., Robo-Cop, Expert Systems). In some embodiments, the resource manager comprises a software program provided on a computer system of the present invention. For example, a software application that performs component failure recoveries and optimizes the receipt and transmission of data (e.g., streaming information) may be used. In some embodiments of the present invention backup hardware and software components are provided with the system. If the resource manager detects a problem with hardware or software, the backup system is engaged. During the development of the present invention, it was found that resource management was required to provide scalability to allow a large number of multimedia events to be processed simultaneously. Without the resource manager, operation had to be conducted using human labor, making the process unacceptably inefficient. In particular, management of resource allocation, resource balancing, and component-failure recovery was needed, wherein the resource manager automatically assigns tasks and allocations to processor components and automatically performs component recoveries.

In some preferred embodiments, the audio information from a media event is received by the processor (e.g., through a multi-link conference bridge/Lucent analog port, with amplification and delay). This information is then converted into streaming information in two different formats, MICROSOFT (a first format) and REAL (a second format), using the separate encoders (other formats such as QuickTime may be implemented). In preferred embodiments, the processor has a dedicated sound card for each of the encoders. The encoded information is then available to send to MICROSOFT and REAL streaming servers, for ultimate delivery to viewers. Optionally, digital rights management (DRM) encryption can be applied to the information (e.g., for the Microsoft encoded media stream). Text information sent from a speech-to-text converter is received by a text processor/broadcaster. The text is translated to the desired language(s) and encoded in a streaming format for delivery (e.g., simultaneous delivery) to one or more FTP servers and/or directly to the viewers. For example, in some embodiments, text is streamed to the viewers by a process using multiple IP sockets (a different socket for each translated language and one for English). The current accumulative complete transcript is sent at preset time intervals to the selected FTP server(s) (one copy of the transcript for each translated language and the original English).

Access to and control of the processor and/or the conference bridge can be limited to system administrators through the use of security protocols. For example, it is sometimes desirable to prevent viewers from having access to and control of the processors or conference bridge. Where the processors and/or conference bridge is controlled remotely, a software application that provides password-based access to the control operations is be provided.

The processor may be configured to run any number of additional tasks including, but not limited to, acting as a web or information server, allowing data storage and management, providing streaming servers, and allowing storage and downloading of software applications (e.g., multimedia players, text viewers, etc.). Any one or more of the processor functions may be provided with a single processor (e.g., in a single computer) or with a plurality of processors. Where multiple processors are used, the processor may be in electronic communication with one another through, for example, direct connections, local area networks, and/or long distance electronic communications networks.

In some embodiments of the present invention, the systems and methods are scaled to allow large volumes of multimedia and text information to be processed. In some large-scale systems, the processor is split into two different functions, each of which may be located on different computers and/or in different physical locations. The first portion is a captioning server that receives text information and processes the text information as desired (e.g., translates text information). The second portion is a text streaming server that transmits streaming text to viewers. In some embodiments, the captioning server is managed by a service provider and a plurality of text streaming servers are in the possession of one or more customers of the service provider. Such a system allows the service provider to handle extremely large volumes of text information and transmit the text information to dedicated text streaming servers for each of its customers. The text streaming servers may then individually send large numbers of text streams to multiple viewers. An illustrative example of such a system is provided below.

1. EXAMPLE

The following example provides a highly scalable Web-based text-streaming platform. This system is built using MICROSOFT development tools, including NET and BIZTALK Server 2000. The system uses MICROSOFT's SQL Server 2000 as the underling database and WINDOWS 2000 server products for foundational infrastructure support. In test conducted during the development of the present invention, the system benchmarked 4000 continuous text streams on a single 600 MHz server. Each text stream only consumes 300 bps of bandwidth. Thus, over 5000 streams can be achieved on one T-1 (1.544 mbps). The system was designed using a multi-threaded model to support an unlimited number of concurrent multi-user live events, and to support many hundreds of thousands to millions of viewers for any one event. The system provides and may be integrated with many beneficial features including, but not limited to:

1) Integration with a small (e.g., less than 7 k) Java-Applet text stream player, which can be configured to automatically download in a few seconds to a viewer's computer without requiring any installation. The player can be integrated to any web page with a few lines of simple HTML code.
2) A fully functional multi-stream server engine is readily installed into any hosting or customer infrastructure, while the captioning server is maintained by a service provider. This allows the service provider to maintain control over content and allows maximum flexibility to meet customer requirements.

3) The text stream can be delivered independent of any other media (audio/video) streaming technology, and can run along side any media player (e.g., REAL, MICROSOFT, QUICKTIME).

4) Unlimited live events.

5) Unlimited event viewers, per one single event.

6) 200 live captionists supported by a single caption server, with the system operating with unlimited numbers of caption servers, as desired.

7) About 10,000 live text streams supported by a single text broadcast server (e.g., using a 1 GHz dual processor).

In practice, audio is acquired from a live event at the venue of the live event using a standard public switched network dial phone or wireless system. The audio is delivered to a speech-to-text converter and the processor of the present invention using a conference bridge. The encoded event is used for direct transmission to viewers or for subsequent on-demand replay with streaming text. In some embodiments, a captionist listens to live audio and captions every word using a standard court reporter stenograph machine connected to a personal computer running captioning software. An interface of the present invention delivers the stream of text from the captionist to the streaming server. English text is filtered with a grammar correction module and is optionally sent to a real-time language translator. The streaming server delivers the text stream to a text stream player located on a viewer's computer. The text steam player allows controls such as text security, language selection, font, color, character size, and viewer interaction (described in detail below). The process is fully automated and controlled using Expert Systems techniques provided by MICROSOFT's BIZTALK Server 2000, for automated process setup and component failure recoveries.

E. Information Flow to and from Viewers

Multimedia and text information is received by viewers through any suitable communication network including, but not limited to, phone connections, the Internet, cable connections, satellite transmissions, direct connections, and the like. A playback device of a viewer receives multimedia and text information. For example, where multimedia information is sent in MICROSOFT or REAL streaming format, viewers access the appropriate streaming server and received streaming information that is played by a MICROSOFT media or REAL media player software application on a playback device (e.g., computer, personal digital assistant (PDA), video monitor, television, projector, audio player, etc.). Text information may also be received using any application that can receive and display (e.g., separately) both multimedia and text information (e.g., using a streaming text Java applet). In some embodiments of the present invention, text box display software (e.g., SPECHE BOX from SPECHE COMMUNICATIONS) is provided to the viewer. The present invention contemplates the use of software to add text-viewing capabilities to preexisting media player software or to provide a stand-alone text viewer (e.g., using a text streaming Java applet) to be used separately but in conjunction with a media player.

In some embodiments, the media player contains a viewer screen for viewing video and a separate text box. The video and audio are controlled by a panel under the video screen that allows for starting, stopping, fast forward, reverse, and volume control. The text box displays the name of the speakers, or their title, and provides a text transcript of their spoken audio. Controls under the text box allow the text to be viewed in different languages and allow the audio to be changed to the language selected. The viewer using the media player can select the option "view transcript" which opens a separate text box containing the current accumulative transcript in the language selected. This text box can be configured to allow text to be edited, copied, printed, searched and otherwise manipulated. The top of the media player also includes a box for the viewer to enter comments/questions and send them back to a question queue on the database. The present invention provides a web-based control for event screening, approval and prioritizing of viewer entered comments/questions. In this case, comments/questions are entered as text and are processed through the systems of invention, although they could also be sent as voice-over-IP audio, public switched network (telephone) audio, email, or in any other desired format. The systems of the present invention are also configured to allow other viewers to view event approved comments/questions.

In some embodiments, language translation is applied to the questions/comment information. For example, in some embodiments text entered by each viewer is translated to the native language of the screener at the event (to facilitate accurate control and screening). All text in the question queue on the database (originally entered by viewers in many different languages) are translated to each viewers' "Selected Language" and refreshed to their browsers as the screener processes new text. In this way, each viewer deals with all information (audio, streaming script text, completed or accumulative transcripts, and comments/questions) in a selected (preferred) language.

In some embodiments of the present invention, audio information is passed from a conference bridge to a speech-to-text converter. The multimedia information from the conference bridge and the text information from the speech-to-text converter are sent to a processor where the media and text are separately encoded into streaming information. The processor is connected to a web server (e.g., a web server comprising FTP, IIS, and C52K servers), databases, and streaming media servers through a network (e.g., a local area network (LAN)). Streaming audio and video information are sent from the processor to the streaming media server and streaming text is sent to a Java applet running on the viewers' browser. A media player (e.g., custom SPECHE BOX software with embedded media player, SPECHE COMMUNICATIONS) viewable by a viewer receives the text and multimedia information and displays the multimedia performance and text to a viewer. The viewer can opt to "view transcript," which sends a request to an FTP server to supply the full transcript (e.g., the full transcript as generated as of the time the viewer selected the option) to the viewer. The viewer can also send information (e.g., comments/questions) back to the processor. Some embodiments, a data control system (e.g., one or more computers comprising a processor and/or databases) allows the viewer to register, provides schedule information on the event, and receive viewer question information. Storage of viewer information in a database at registration allows viewer preferences to be determined and stored so that delivered content is correct for each individual. Customer registration and event scheduling information is also stored in the database to automate and control event operations using the Robo-Cop (Expert Systems), and to administrate the transaction/business relationship.

II) Applications

A number of exemplary applications of the systems and methods of the present invention are provided below.

A. Foreign Language Motion Pictures

When a major motion picture is in an English-speaking country and to be released in a non-English-speaking country, the English dialogue has to be replaced with the language of the country that the film will be screened in. It is to the film company's advantage, to release the "Foreign Version" as soon as possible after the release of the film in "Domestic Version." Foreign versions generally cannot be released at the same time as the domestic version because the film director typically continues to edit the film right up to the last day before the sound track is sent to the laboratory for processing. In today's motion picture business, the movie is completed about ten days before the release date. Once the film is completed, a new sound track is made that does not have any dialogue in it (i.e., it is a version with only music and effects). This copy, known as an "M & E," is sent to every foreign territory. It is played for a translator who writes a script for the finished film. New dialogue is recorded in the foreign language to best match the script and the lip movement of the original actors on the screen. The new dialogue is then mixed into the M & E and a new sound track is created. Foreign prints are made and the film is released to theatres. To help speed up the process, any reels of the film that the director says will not be re-edited are sent to the foreign territories along with a temporary mix of the sound before the picture is finished. However, the director will usually re-edit the reels that were previously designated as complete. Some of the new dialogue recordings will not be used and some will have to be re-done when the film is finished. This process adds delays. The sound has to be reedited and re-mixed in the foreign language to make up for the changes. In the current system, every change has to be shipped overseas, go through customs and be delivered to the sound studio. This can take up to a week for every change.

Using the systems and methods of the present invention, time and cost is significantly reduced. The systems of the present invention allow multimedia information to be transferred over the Internet. For example, using the systems of the present invention, text translations are readily made and synchronized to the video and "M & E" audio. This is important because the length of the film cannot vary from the original by more than + or −1/8sth of a second and the sound and picture cannot vary more than + or −1/8sth of a second from each other. The systems of the present invention allow delivery of a script with every sound change and allow a synchronized product to be available in less than a day. Moreover, a text file of all dialogue can be to be provided, as required by the industry.

Thus, the systems and methods of the present invention provide a comprehensive Internet based solution that enables overseas territories to efficiently and timely re-dub motion pictures in domestic languages. Throughout the iterations of a motion pictures development, the audio, video, and corresponding text are distributed overseas online, eliminating logistical bottlenecks associated with sending physical reels and the time associated with waiting for transcriptions. The product can be delivered promptly in under a day and in multiple languages.

A similar process can be applied to provide translated text (e.g., subtitles) for television programming or any other multimedia presentation where it may be desirable to have language translations applied (e.g., video presentations on airlines). In some embodiments, an original video with audio in a first language (e.g., English) is processed into encoded audio and video (e.g., in WMA and WMV file formats). In some embodiments, encoded audio and low quality encoded video are sent (e.g., via Web FTP) to a conference bridge of the present invention, where audio is converted to text by a speech-to-text converter and translated by a language translator using methods described above. The translated text (e.g., in the form of a translated script) is then sent to a foreign territory where the translated information is used to re-dub the video with foreign language voice over. Text information (in one or more different languages) may also be sent to a video studio to prepare sub-titles in any desired language (e.g., as a final product or for preparing an intermediate video to be sent to the foreign territory to prepare a re-dubbed video). The physical location of any of the systems does not matter, as information can be sent from one component of the system to another over communication networks.

B. Transcripts of News Events and Business and Legal Proceedings

Many newsworthy events (e.g., political speeches, etc.), business proceedings (e.g., board meetings), and legal proceedings (e.g., trials, depositions, etc.) benefit from or require the generation of text transcripts (and optional translations) of spoken language. The systems and methods of the present invention provide means to generate real-time (or subsequent) text transcripts of these events. The text transcripts can be provided so as to allow full manipulation of the text (e.g., searching, copying, printing, etc.). For example, news media personnel can receive real-time (or subsequent) transcripts of newsworthy speeches, allowing them to select desired portions for use in generating their news reports. A major advantage of using the systems and methods of the present invention is that the user of the text information need not be present at the location where the event is occurring. Virtual business meetings and legal proceedings are possible, where each of the participants receives a real-time (or subsequent) copy of the text of the proceeding, as it occurs. Non-live event transcripts/translations are created after the audio from a prior live event has been recorded for subsequent playback for transcription and translation by captionist/transcriptionist. In some embodiments of the present invention, a potential corporate customer registers (and is approved) on a web site and pre-buys a block of minutes (or hours) of transcription (and optionally translation) services. During a corporate meeting (e.g., Board Meeting), the meeting chairperson (e.g., on a quality speakerphone) calls into the systems of the present invention and enters their service access code for the transcription/ translation services pre-purchased. The meeting participants conduct a normal meeting, speaking their name prior to participation. At the end of the meeting, the chairperson simply hangs-up the phone. Within a required duration (predetermined as a service option), the transcripts (in selected languages) are e-mailed or otherwise delivered to the designated address (or made available on a secured web sight). The customer's account is decremented, and they are notified when service time reaches a pre-determined balance. This service would also make the recorded audio available in the original (and optionally translated) languages.

The systems and methods of the present invention may also be integrated with presentation software (e.g., MICROSOFT POWERPOINT) to facilitate information exchange during presentations or demonstrations. For example, live or prerecorded POWERPOINT presentations are integrated with the streaming text and/or multimedia systems of the present invention to allow added information content to the slides presented in the POWERPOINT presentation. In some embodiments, viewers (e.g., participants at a business conference) can access the POWERPOINT presentation over the web and view the images (moving back and forth as desired) as they desire.

C. Internet Broadcasting

The Internet has become a primary source of information for many people and provides a means for providing up-to-date information globally. Unlike radio, television, and satellite transmissions, the Internet is not limited to a finite number of "channels." Thus, a user can obtain news and information from obscure sources and locations that would not otherwise be available. The systems and methods of the present invention allow efficient and flexible broadcasting of information over the Internet—particularly for live events and for diverse groups of users who may have limited access to audio and video monitoring devices and who may speak a wide range of languages. With the systems of the present invention, real-time streaming text, as well as audio and video is provided to users. The text and audio are selected to match the language of the user.

A complete transcript is made available online upon the close of the event with view/print function, highest quality, automated translations into a dozen foreign languages, cut and paste capabilities, and key word search function with a complete transcript time stamping function for exact synchronization between text and audio.

D. Interactive Events

The systems and methods of the present invention provide for interactive events involving viewers located in different areas. These interactive events include talk-show formats, debates, meetings, and distance learning events. In some embodiments, interactive events are conducted over the Internet. For example, an event moderator can control the system through a web-based interface so that participants need not be burdened with equipment shipping, training, and maintenance. Participants can be anywhere in the world allowing for virtual web debates, distance instruction and education in which interaction is critical to the learning process, and intra organizational communication within large organizations with multiple offices in various foreign countries. Any event that can benefit from question and answer interactivity with an offsite audience finds use with the systems and methods of the present invention. Participant questions can be directed over the telephone or typed as in a chat format and can be viewed by all other participants in real time and/or after the fact. The systems and methods of the present invention provide dramatic flexibility for involving participants who speak different languages. The systems and methods of the present invention translate all viewer comments and questions from their selected language to that of the screener (or moderator) to facilitate screening and prioritizing. All comments and questions entered (and approved by the screener) in various languages by all viewers are translated to the selected language of each viewer. This approach insures that all viewers gain the greatest benefit from an event, by interacting in their selected language for: streaming transcript, accumulative complete transcripts, audio dialogue, and comments/questions entered and received. In some embodiments, the web presenter accesses a database of the present invention to register and schedule the event. The database can also be used to store an image file of the presenter, presentation files (e.g., POWERPOINT presentation files), and a roster of information pertaining to invited participants. The information in the database may be updated during the presentation. For example, questions from viewer participants and responses may be stored on the database to allow them to be viewed at the request of any of the participants. Questions from viewer participants may be received aurally using voice-over IP technology. These questions are directed to the conference bridge, with the audio being converted to text by a speech-to-text converter and the text information and/or corresponding audio information being routed to a processor for encoding as text and/or multimedia information streams, as well as storage in the database. At the request of any participant, the questions may be viewed as text and/or audio in any desired language.

E. Text Transcriptions for the Hearing and Vision Impaired

Hearing impaired individuals currently have access to closed captioning systems for use in conjunction with a limited number of movie and televised events. The systems and methods of the present invention provide superior resources for hearing impaired individuals, providing complete, cumulative text representations of audio events and allowing fully functional text for Internet multimedia events. With closed captioning technologies, words appear briefly on a viewer's screen, and are then gone. The systems and methods of the present invention allow aggregation of words into a complete document that can be made available in its entirety, in any desired language, during an event and/or at the end of events. The systems and methods of the present invention provide hearing impaired individuals access to Internet broadcasting events including, but not limited to, financial information, live news coverage, and educational content. At present, the hearing impaired community is being left out of the Internet broadcasting movement. The systems and methods of the present invention fill this gap, allowing hearing impaired, as well as vision impaired users, to automatically select the desired formatting (font size, style, color, text language) for their needs.

All publications and patents mentioned in the above specification are herein incorporated by reference. Various modifications and variations of the described methods and systems of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

The invention claimed is:

1. A system for providing streaming text information over an Internet, comprising software configured to: i) permit transfer of text information from a computer to an Internet without the use of a serial IP device attached to a serial port of said computer; and ii) associate with an operating system of said computer to permit conversion of text information generated from a plurality of different speech-to-text captioning software protocols into ASCII format for transmission over said Internet.

2. The system of claim 1, wherein said software comprises a parsing routine configured to automatically identify said speech-to-text captioning software protocols and to convert said speech-to-text captioning software protocols to ASCII text information.

* * * * *